(12) United States Patent
Lee

(10) Patent No.: US 12,158,387 B2
(45) Date of Patent: Dec. 3, 2024

(54) SENSING DEVICE FOR ELECTROMECHANICAL BRAKE

(71) Applicant: HYUNDAI MOBIS CO., LTD., Seoul (KR)

(72) Inventor: Dong Geun Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 361 days.

(21) Appl. No.: 17/573,929

(22) Filed: Jan. 12, 2022

(65) Prior Publication Data

US 2023/0094394 A1 Mar. 30, 2023

(30) Foreign Application Priority Data

Sep. 29, 2021 (KR) ........................ 10-2021-0129108

(51) Int. Cl.
| | | |
|---|---|---|
| *B60T 13/74* | (2006.01) | |
| *F16D 65/18* | (2006.01) | |
| *G01L 5/13* | (2006.01) | |
| *F16D 66/00* | (2006.01) | |
| *F16D 121/04* | (2012.01) | |
| *F16D 121/24* | (2012.01) | |
| *F16D 125/40* | (2012.01) | |

(52) U.S. Cl.
CPC .............. *G01L 5/136* (2013.01); *F16D 65/18* (2013.01); *F16D 2066/005* (2013.01); *F16D 2121/04* (2013.01); *F16D 2121/24* (2013.01); *F16D 2125/40* (2013.01)

(58) Field of Classification Search
CPC . G01L 1/02; G01L 5/136; F16D 65/18; F16D 2066/005; F16D 2121/04; F16D 2121/24; F16D 2125/40
See application file for complete search history.

(56) References Cited

U.S. PATENT DOCUMENTS

| | | | | |
|---|---|---|---|---|
| 1,994,388 A | * | 3/1935 | Erichsen ................... | G01L 1/02 177/208 |
| 5,060,525 A | * | 10/1991 | Hafner ..................... | F16L 55/00 73/756 |

(Continued)

FOREIGN PATENT DOCUMENTS

| | | |
|---|---|---|
| DE | 10350085 A1 | 6/2005 |
| DE | 102015223782 A1 | 3/2017 |

(Continued)

OTHER PUBLICATIONS

Office Action issued on May 17, 2022 in the corresponding German Patent Application No. 102021133832.8.

(Continued)

*Primary Examiner* — Nicholas J Lane
(74) *Attorney, Agent, or Firm* — Novo TechIP International PLLC

(57) ABSTRACT

Disclosed is a sensing device for an electromechanical brake, including: a power part configured to generate an operation force for braking when power is applied thereto; a housing positioned on the power part; a pressurized part positioned on the housing and pressurized by a reaction force caused by driving of the power part; and a sensing part connected to the housing and configured to sense a pressing force by the pressurized part.

10 Claims, 9 Drawing Sheets

(56) References Cited

U.S. PATENT DOCUMENTS

| | | | |
|---|---|---|---|
| 6,938,735 B1* | 9/2005 | Hilzinger | F16D 65/18 188/162 |
| 2017/0130768 A1* | 5/2017 | Matsuda | B60G 15/068 |
| 2017/0321773 A1* | 11/2017 | Lee | F16D 65/18 |

FOREIGN PATENT DOCUMENTS

| | | |
|---|---|---|
| JP | 2013-019509 A | 1/2013 |
| KR | 10-0560603 B1 | 3/2006 |
| KR | 10-2018-0126288 A | 11/2018 |
| KR | 10-2019-0037894 A | 4/2019 |
| KR | 10-2020-0041956 A | 4/2020 |

OTHER PUBLICATIONS

Office Action issued on Jan. 18, 2023 in the corresponding Korean Patent Application No. 10-2021-0129108.

* cited by examiner

SENSING DEVICE FOR ELECTROMECHANICAL BRAKE

CROSS-REFERENCE TO RELATED APPLICATION

This application claims priority from and the benefit of Korean Patent Application No. 10-2021-0129108, filed on Sep. 29, 2021, which is hereby incorporated by reference for all purposes as if set forth herein.

BACKGROUND

Field

Exemplary embodiments of the disclosure relate to a sensing device for an electromechanical brake, and more particularly, to a sensing device for an electromechanical brake, which can obtain, as a uniform output value, a reaction force being generated in a process of transferring an output by a motor.

Discussion of the Background

In general, a brake system for braking is essentially mounted in a vehicle, and recently, various kinds of systems for obtaining a stronger and more stable braking force have been proposed.

Examples of the brake system include an anti-lock brake system (ABS) for preventing sliding of wheels during braking, a brake traction control system (BTCS) for preventing a slip of drive wheels during a sudden unintended acceleration or sudden acceleration of a vehicle, and an electronic stability control system (ESC) for stably maintaining the driving state of a vehicle by controlling brake hydraulic pressure through combination of the anti-lock brake system and the traction control.

In general, the electromechanical brake system includes an actuator that receives, as an electrical signal, a driver's braking intention from a pedal displacement sensor for sensing the displacement of the pedal when the driver steps on the pedal, and supplies a pressure to a wheel cylinder.

In the electromechanical brake system including such an actuator, the actuator is operated by a pedal effort to generate a braking pressure. In this case, the braking pressure is generated by pressing a piston through conversion of a rotating force of the motor into a linear motion.

However, the related art has a problem in that, if a separate load sensor is not provided, a feedback control of a real braking force is not possible. Further, the related art has a problem in that, if a separate load sensor is provided, a deformation pattern in accordance with a contact position with a caliper body is changed due to the position of a local sensing element, and thus the measurement dispersion becomes large. Accordingly, there is a need to solve such problems.

The background technology of the disclosure is disclosed in Korean Patent Application Publication No. 2018-0126288 (published on Nov. 27, 2018 and entitled "Electromechanical Brake System".

SUMMARY

Various embodiments are directed to a sensing device for an electromechanical brake, which can obtain, as a uniform output value, a reaction force being generated in a process of transferring an output by a motor.

In an embodiment, a sensing device for an electromechanical brake includes: a power part configured to generate an operation force for braking when power is applied thereto; a housing part mounted on the power part; a pressurized part mounted on the housing part and pressurized by a reaction force caused by driving of the power part; and a sensing part connected to the housing part and configured to sense a pressing force by the pressurized part.

The power part may include: a power body part; a power motor part mounted on the power body part, and driven when the power is applied thereto; a power screw part mounted on the power body part and rotated by the power motor part; a power bearing part configured to support the power screw part; and a power piston part moved in a straight line as the power screw part is rotated.

The housing part and the pressurized part may be disposed between the power piston part and a power nut part, the power nut part moved in a straight line by the power screw part and configured to move the power piston part, and the pressurized part is pressurized by the reaction force of the power piston part.

The housing part and the pressurized part may be moved in a straight line by the power screw part and disposed between the power piston part and a power nut part configured to move the power piston part, and the pressurized part may be pressurized by the reaction force of the power piston part.

The housing part may include: a housing body part penetrated by the power part, and having an open front side and a space part formed therein; and a housing cover part mounted on the housing body part, and configured to prevent separation of the pressurized part disposed in the space part.

The pressurized part may include: a pressurized fluid part configured to fill the housing part; a pressurized washer part projecting from the housing part, and configured to cover the pressurized fluid part and press the pressurized fluid part by an external force; and a pressurized airtight part mounted on the housing part, coming into close contact with the pressurized washer part, and configured to block leakage of the pressurized fluid part.

The pressurized fluid part may fill the housing part or be discharged from the housing part through a flow path that is formed on the housing part and openable or closable.

The pressurized washer part may include: a first washer part inserted into the housing part with its movement limited, and configured to cover the pressurized fluid part; and a second washer part formed on the first washer part, projecting out of the housing part, and pressurized by the reaction force of the power part.

The pressurized part may further include a pressurized recovery part built in the housing part, and configured to elastically support the pressurized washer part.

The sensing part may be built in the power part, and connected to the housing part.

The sensing part may be inserted into a rear side of the housing part, and kept connected with the housing part.

The sensing part may be inserted into a lateral side of the housing part, and kept connected with the housing part.

The sensing part may be disposed outside the power part, and connected to the housing part, built in the power part, by a sensing flow path part.

According to the sensing device for the electromechanical brake according to the disclosure, the pressurized part mounted on the housing part provides uniform pressure as the power part is driven, which makes it possible to stably maintain the measurement precision of the sensing part connected to the housing part.

DETAILED DESCRIPTION OF THE ILLUSTRATED EMBODIMENTS

Figure 1:
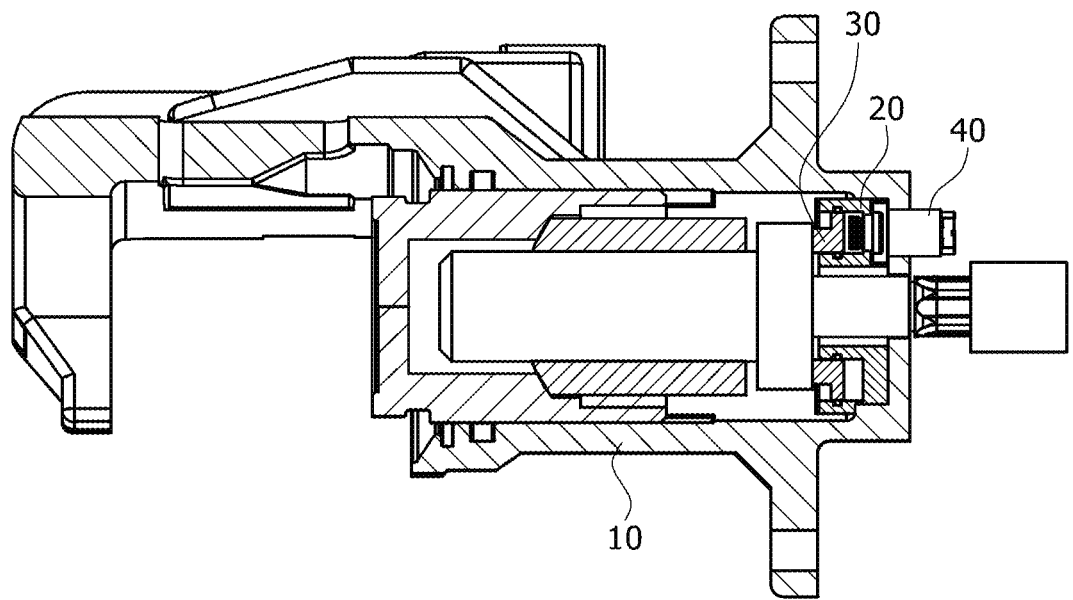
FIG. 1 is a view schematically illustrating a sensing device for an electromechanical brake according to an embodiment of the disclosure.

Hereinafter, a sensing device for an electromechanical brake will be described with reference to the accompanying drawings through various exemplary embodiments. In such a process, the thicknesses of lines or the sizes of constituent elements illustrated in the drawings may be exaggerated for clarity and convenience in explanation. Further, terms to be described hereinafter have been defined in consideration of functions in the disclosure, and may differ depending on a user or an operator's intention, or practice. Accordingly, each term should be defined based on the contents over the entire specification.

FIG. 1 is a view schematically illustrating a sensing device for an electromechanical brake according to an embodiment of the disclosure. Referring to FIG. 1, a sensing device 1 for an electromechanical brake according to an embodiment of the disclosure includes a power part 10, a housing 20, a pressurized part 30, and a sensing part 40.

The power part 10 generates an operation force for braking when power is applied thereto. For example, the power part 10 may generate a braking force in such a manner that a motor is driven when the power is applied to the power part 10 and a pad presses a disc mounted on a wheel.

The housing 20 is positioned (or mounted) on the power part 10. For example, the housing 20 may be built in the power part 10, and the position of the housing 20 may differ depending on the design. The housing 20 may be positioned (or disposed) on a power shaft on which the power of the power part 10 is generated.

The pressurized part 30 is mounted on the housing 20, and is pressurized by a reaction force caused by the driving of the power part 10. For example, the pressurized part 30 may be in surface contact with the power part 10, and may provide a uniform pressure to the sensing part 40 while pushed out by the reaction force of the power part 10.

The sensing part 40 is connected to the housing 20, and senses a pressing force by the pressurized part 30. For example, since the pressurized part 30 provides the uniform pressure, one sensing part 40 may be connected to the housing 20 to measure the pressure.

Figure 2:
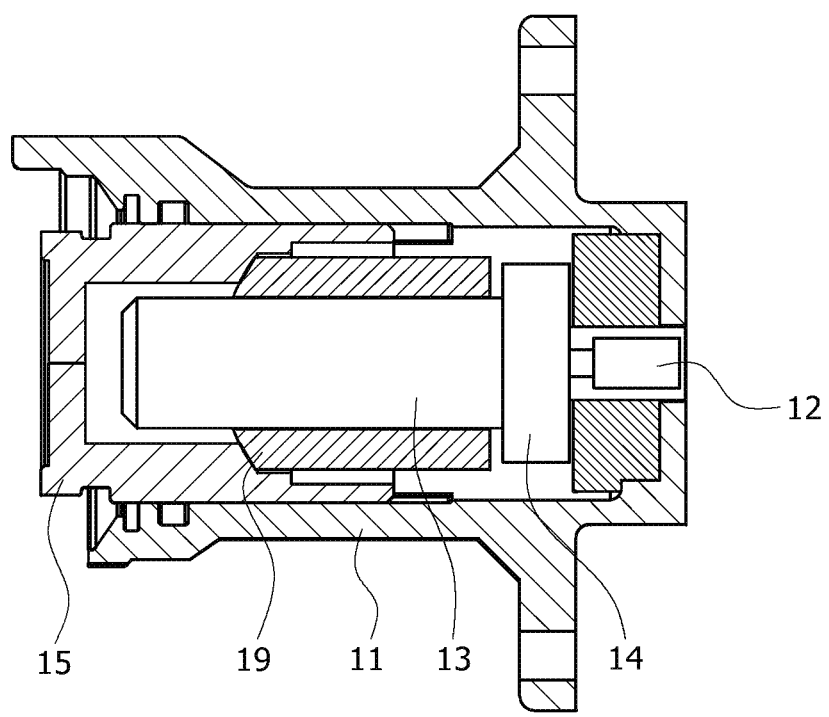
FIG. 2 is a view schematically illustrating a power part according to an embodiment of the disclosure.

FIG. 2 is a view schematically illustrating a power part according to an embodiment of the disclosure. Referring to FIG. 2, the power part 10 according to an embodiment of the disclosure includes a power body 11, a power motor 12, a power screw 13, a power bearing 14, and a power piston 15.

The power body 11 is mounted on a vehicle body, and is disposed near a wheel being rotated. For example, the power body 11 may be fixedly installed on the vehicle body, and a space for accommodating the power motor 12, the power screw 13, the power bearing 14, and the power piston 15 may be formed inside the power body 11.

The power motor 12 is mounted on the power body 11, and is driven when the power is applied thereto. The power screw 13 is built in the power body 11, and is rotated by the power motor 12. As an example, the power motor 12 may be directly connected to the power screw 13, or may be indirectly connected to the power screw 13 through a separate transfer gear, and as the power motor 12 is driven, the power screw 13 may be rotated.

The power bearing 14 supports the power screw 13. For example, the power bearing 14 may be built in the power body 11, and may be penetrated by the power screw 13. The power screw 13 may be rotatably supported by the power bearing 14.

The power piston 15 is moved along an axis (e.g., a straight line) as the power screw 13 is rotated. For example, the power piston 15 is moved by a power nut part 19 being moved in an axis by the power screw 13, and the moved power piston 15 may keep a brake pad coming into close contact with the disc of the wheel.

Figure 3:
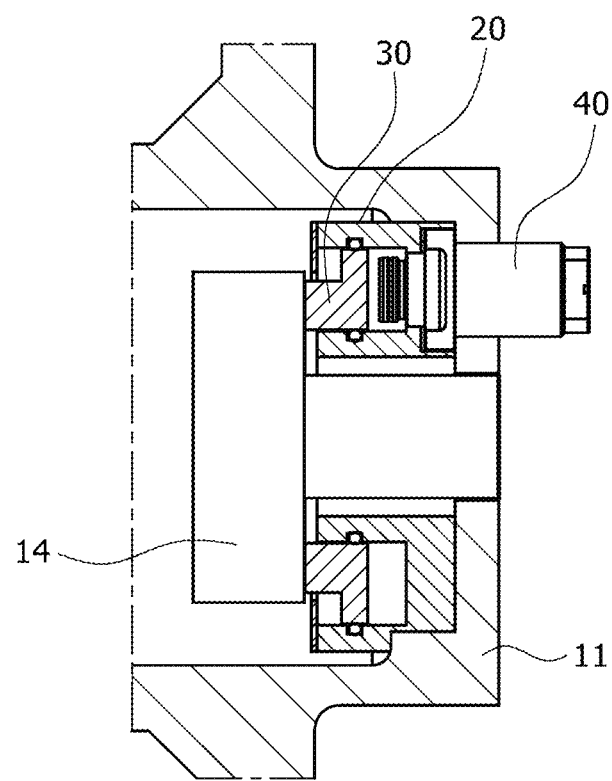
FIG. 3 is a view schematically illustrating a state where a housing and a pressurized part are disposed between a power body and a power screw according to an embodiment of the disclosure.

FIG. 3 is a view schematically illustrating a state where a housing and a pressurized part are disposed between a power body and a power screw according to an embodiment of the disclosure. Referring to FIG. 3, the housing 20 and the pressurized part 30 may be assembled with each other to be able to be modularized, and may be disposed between the power body 11 and the power screw 13. For example, the housing 20 and the pressurized part 30 may be disposed between the power bearing 14 and the power body 11, and the pressurized part 30 may be pressurized by the reaction force of the power bearing 14.

Figure 4:
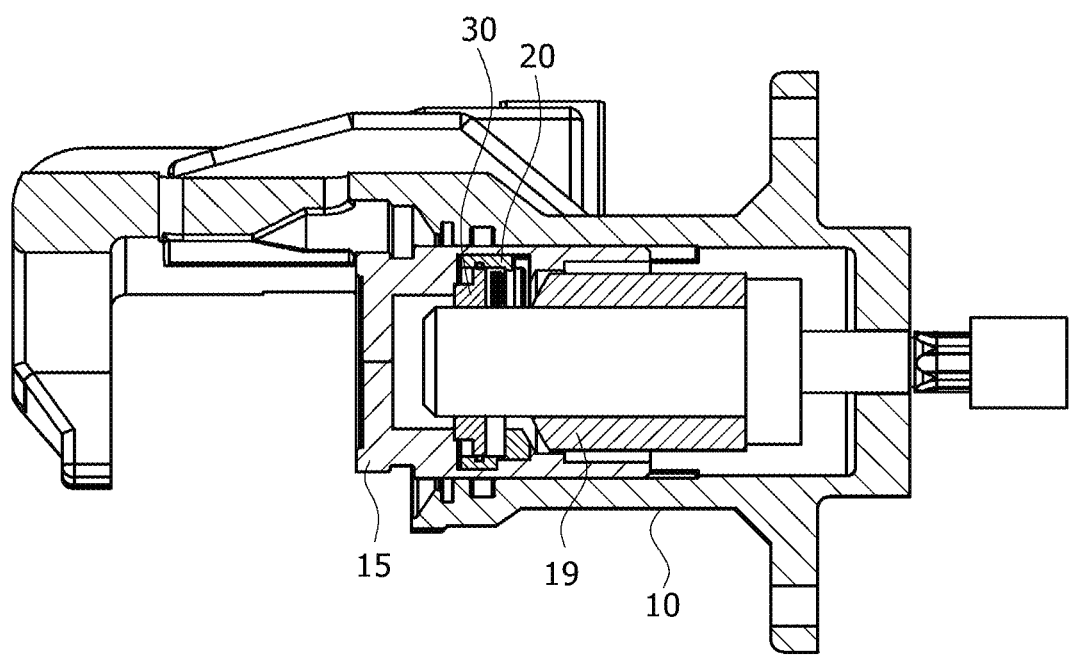
FIG. 4 is a view schematically illustrating a state where a housing and a pressurized part are disposed between a power screw and a power piston according to an embodiment of the disclosure.

FIG. 4 is a view schematically illustrating a state where a housing and a pressurized part are disposed between a power screw and a power piston according to an embodiment of the disclosure. Referring to FIG. 4, the housing 20 and the pressurized part 30 may be assembled with each other to be able to be modularized, and may be disposed between the power screw 13 and the power piston 15. For example, the housing 20 and the pressurized part 30 may be disposed between the power nut part 19 and the power piston 15, and the pressurized part 30 may be pressurized by the reaction force of the power piston 15.

Figure 5:
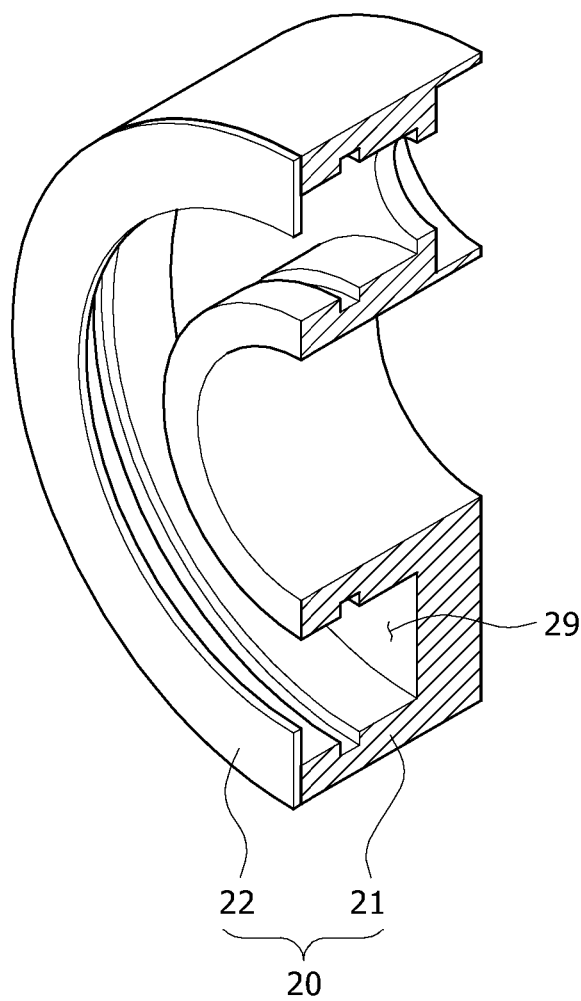
FIG. 5 is a view schematically illustrating a housing according to an embodiment of the disclosure.

FIG. 5 is a view schematically illustrating a housing according to an embodiment of the disclosure. Referring to FIG. 5, the housing 20 according to an embodiment of the disclosure includes a housing body part 21 and a housing cover part 22.

The power part 10 penetrates the housing body part 21. The housing body part 21 has an open front side, and a space region 29 formed therein. For example, the housing body part 21 may be in the shape of a ring in which the front side of the housing body part 21 is opened, and may be penetrated by the power screw 13 or the motor shaft of the power motor 12.

The housing cover part 22 is mounted on the housing body part 21, and prevents separation of the pressurized part 30 disposed in the space region 29. For example, the housing cover part 22 may be mounted on the front side of the housing body part 21, and may surround a part of the pressurized part 30 inserted into the space region 29.

Figure 6:
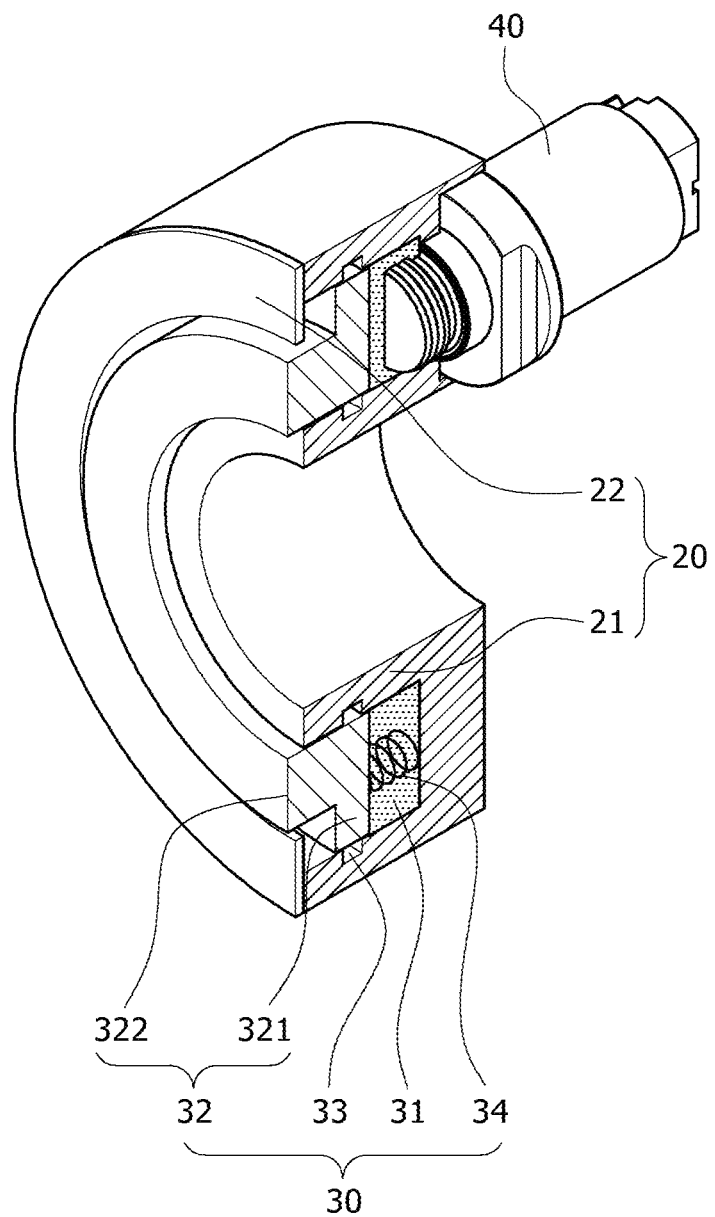
FIG. 6 is a view schematically illustrating a pressurized part according to an embodiment of the disclosure.

FIG. 6 is a view schematically illustrating a pressurized part according to an embodiment of the disclosure. Referring to FIG. 6, the pressurized part 30 according to an embodiment of the disclosure includes a pressurized fluid part 31, a pressurized washer 32, and a pressurized airtight part 33.

The pressurized fluid part 31 fills the housing 20. For example, the pressurized fluid part 31 may be a fluid that fills the space region 29 formed in the housing body part 21. The pressurized fluid part 31 may be transferred to or discharged from the housing body part 21 through a flow path that is formed in the housing body part 21 and openable or closable.

The pressurized washer 32 covers the pressurized fluid part 31, projects from the housing 20, and presses the pressurized fluid part 31 by an external force. For example, the pressurized washer 32 may include a first washer 321 inserted into the space region 29 formed in the housing body part 21 and coming into close contact with the housing body part 21, and a second washer 322 formed on the first washer 321, extended forward, and projecting out of the housing 20. The first washer 321 may be locked by the housing cover part 22 with its movement limited, and may be kept inserted into the housing body part 21. The second washer 322 is exposed to an outside without interfering with the housing cover part 22, and is pressurized by the reaction force of the power part 10. The second washer 322 may be pressurized to the power bearing 14, or may be pressurized to the power piston 15.

The pressurized airtight part 33 is mounted on the housing 20, and comes into close contact with the pressurized washer 32 to block the leakage of the pressurized fluid part 31. For example, one or more pressurized airtight parts 33 may be mounted inside the housing body part 21, and may come into close contact with the first washer 321 to prevent the leakage of the pressurized fluid part 31.

The pressurized part 30 according to an embodiment of the disclosure may further include a pressurized recovery part 34. The pressurized recovery part 34 is built in the housing 20, and elastically supports the pressurized washer 32. For example, the pressurized recovery part 34 may be in the form of a coil spring, and a plurality of pressurized recovery parts may support the first washer 321, and may restore the pressurized washer 32, from which the external force is removed, to the original position.

Figure 7:
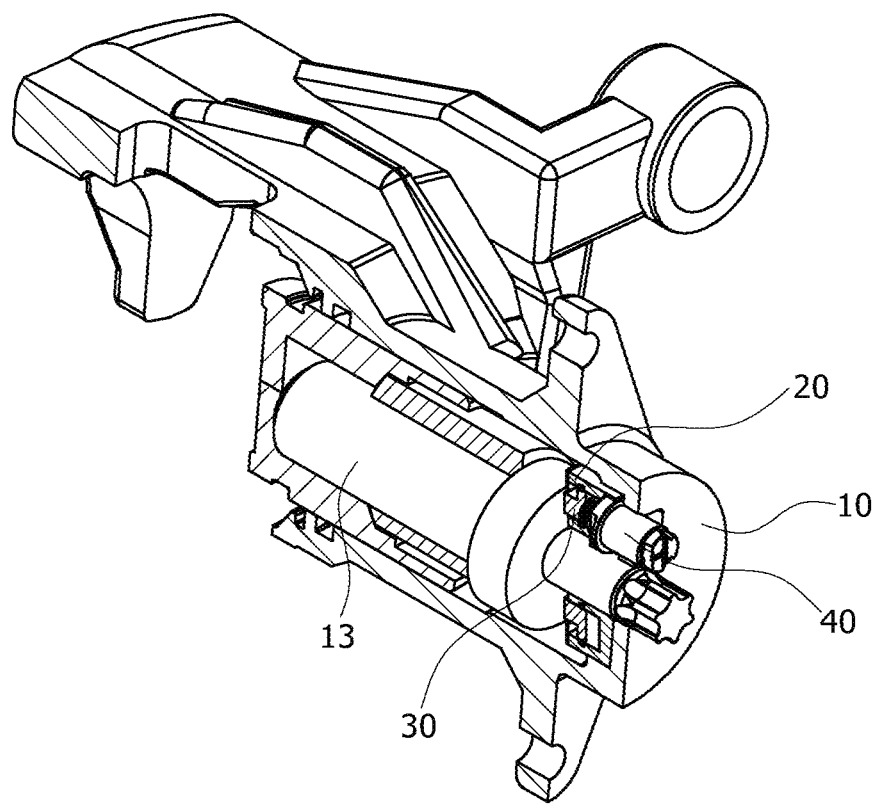
FIG. 7 is a view schematically illustrating a state where a sensing part is built in a length direction of a power part according to an embodiment of the disclosure.
Figure 8:
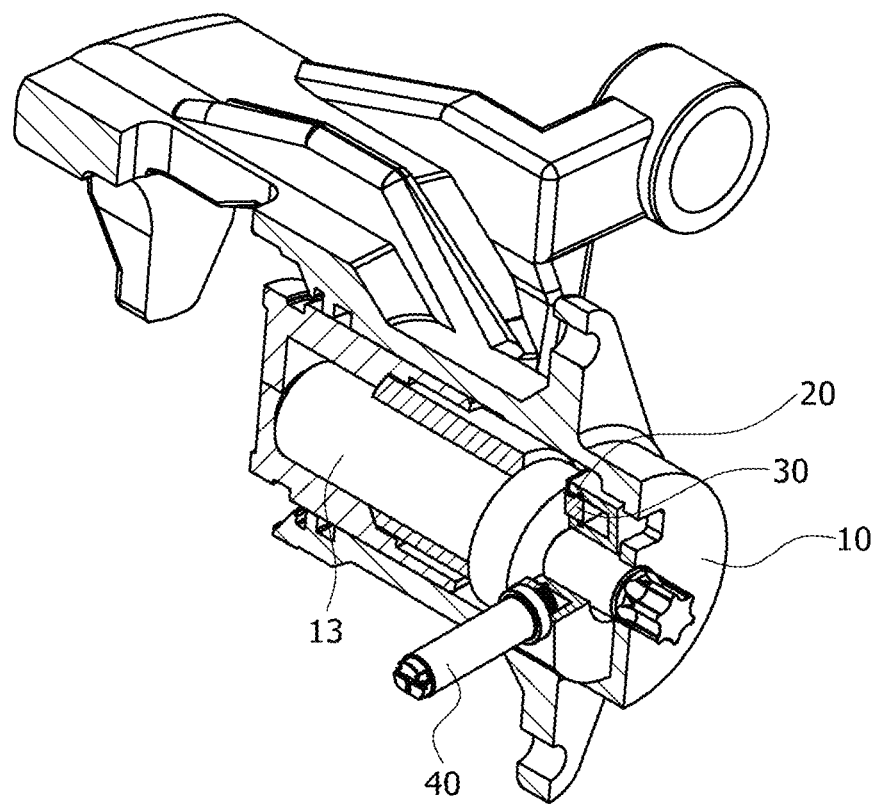
FIG. 8 is a view schematically illustrating a state where a sensing part is built in a direction orthogonal to a power part according to an embodiment of the disclosure.

FIG. 7 is a view schematically illustrating a state where a sensing part is built in a length direction of a power part according to an embodiment of the disclosure, and FIG. 8 is a view schematically illustrating a state where a sensing part is built in a direction orthogonal to a power part according to an embodiment of the disclosure. Referring to FIGS. 7 and 8, the sensing part 40 according to an embodiment of the disclosure is built in the power part 10, and is connected to the housing 20. For example, the sensing part 40 may measure the pressure of the fluid that fills the housing body part 21, and may be disposed to have a length in the same direction as the length of the power screw 13 (refer to FIG. 7), or may be disposed to have a length in a direction orthogonal to the length of the power screw 13 (refer to FIG. 8). The sensing part 40 may be pressurized into the housing body part 21, and may be kept directly connected to the housing body part 21. In case that the sensing part 40 is horizontally disposed in the length direction of the power screw 13, the sensing part 40 may be inserted into the rear side of the housing body part 21 of the housing 20, and may be kept connected with the housing body part 21. Further, in case that the sensing part 40 is disposed orthogonally to the length direction of the power screw 13, the sensing part 40 may be inserted into the lateral side of the housing body part 21 of the housing 20, and may be kept connected with the housing body part 21. Such a disposition structure of the sensing part 40 may differ depending on the shapes of the power part 10 and the housing 20.

Figure 9:
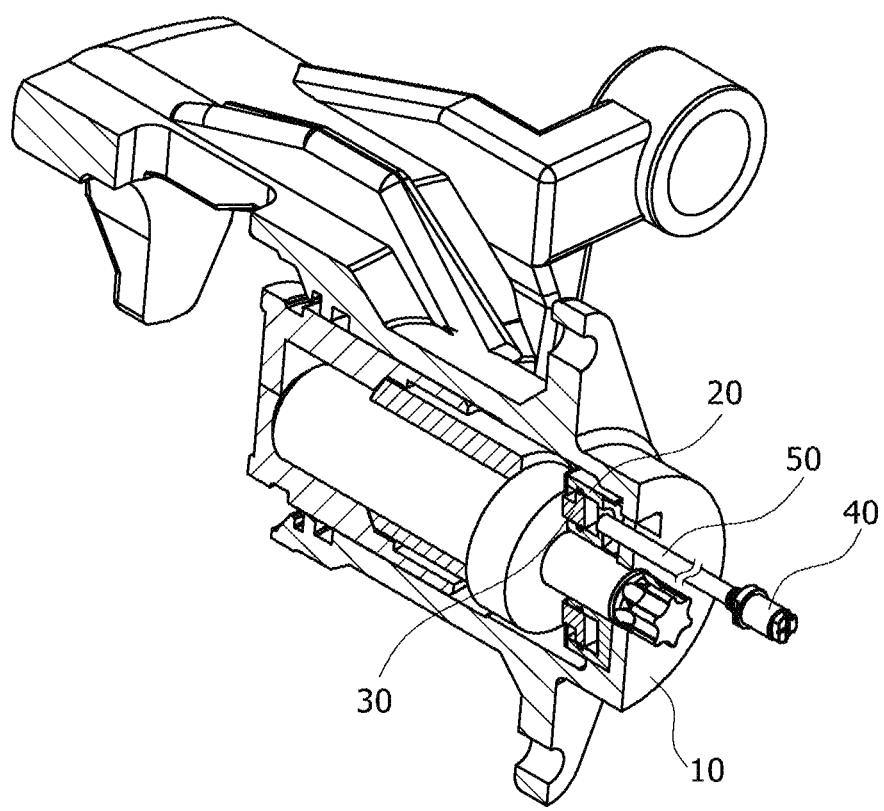
FIG. 9 is a view schematically illustrating a state where a sensing part is disposed outside a power part according to an embodiment of the disclosure.

FIG. 9 is a view schematically illustrating a state where a sensing part is disposed out of a power part according to an embodiment of the disclosure. Referring to FIG. 9, the sensing part 40 according to an embodiment of the disclosure is disposed outside the power part 10, and is connected to the housing 20 built in the power part 10. For example, the sensing part 40 may be fixedly installed on the outer side of the power part 10, and may be indirectly connected to the housing 20 through a sensing flow path part 50.

The operation of the sensing device for the electromechanical brake according to an embodiment of the disclosure, which has the aforementioned structure, will be described as follows.

If the pressurized fluid part 31 fills the space region 29 formed in the housing body part 21, the space region 29 is sealed by the pressurized washer 32, and the housing cover 22 is mounted on the housing body part 21 and thus restrains the pressurized washer 32. Further, the housing body part 21 is directly or indirectly connected to the sensing part 40.

The housing body part 21 is disposed between the power screw 13 and the power body 11 or between the power screw 13 and the power piston 15.

If a brake pedal is operated in the above-described state, the power screw 13 is rotated as the power motor 12 is driven, and the power piston 15 is moved by the power screw 13. Accordingly, the brake pad presses the disc formed on the wheel.

Meanwhile, the pressurized washer 32 is pressurized by the reaction force that is generated in the pressurization process of the power piston 15. If the pressurized washer 32 is pressurized, the pressure of the fluid filling the space region 29 is uniformly increased.

Accordingly, although being connected to various points of the housing body part 21, the sensing part 40 measures the uniformly increased pressure of the fluid, and thus the measurement precision can be stably maintained.

According to the sensing device for the electromechanical brake according to an embodiment of the disclosure, the pressurized part 30 mounted on the housing 20 provides the uniform pressure as the power part 10 is driven, which makes it possible to stably maintain the measurement precision of the sensing part 40 connected to the housing 20.

Although exemplary embodiments of the disclosure have been described for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A sensing device for an electromechanical brake, comprising:

a power part configured to generate an operation force for braking;

a pressurized part configured to be pressurized by a reaction force caused by driving of the power part;

a housing coupled to the power part and comprising inner and outer sidewalls with a space region therebetween, wherein the pressurized part is movably disposed at the space region of the housing; and a sensing part connected to the housing and configured to sense a pressing force generated by the pressurized part, wherein the pressurized part comprises:
- a pressurized fluid disposed at the space region of the housing;
- a pressurized washer having a portion disposed at the space region of the housing and configured to cover and press the pressurized fluid at the space region of the housing;
- a pressurized airtight part positioned on the inner and outer sidewalls of the housing, in contact with the pressurized washer, and configured to block leakage of the pressurized fluid; and
- a pressurized recovery part disposed at the space region of the housing and configured to elastically support the pressurized washer, and wherein the pressurized washer comprises:
- a first washer disposed at the space region of the housing and configured to seal a gap between the inner and outer sidewalls of the housing to cover the pressurized fluid disposed at the space region of the housing; and
- a second washer disposed on the first washer, projecting out from the space region of the housing, and configured to be pressurized by the reaction force caused by driving of the power part, wherein the second washer is in contact with the inner sidewall of the housing and spaced apart from the outer sidewall of the housing.

2. The sensing device of claim 1, wherein the power part comprises:
- a power body;
- a power motor positioned on the power body;
- a power screw connected to the power body and configured to be rotated by the power motor;
- a power bearing configured to support the power screw; and
- a power piston configured to move along an axis when the power screw is rotated.

3. The sensing device of claim 2, wherein:
the housing and the pressurized part are positioned between the power bearing and the power body, and
the pressurized part is pressurized by the reaction force of the power bearing.

4. The sensing device of claim 2, further comprising a power nut part configured to move along an axis and move the power piston when the power screw rotates,
wherein the housing and the pressurized part are disposed between the power piston and the power nut part, and the pressurized part is pressurized by the reaction force of the power piston.

5. The sensing device of claim 1, wherein the housing comprises:
- a housing body part having an open front side exposing the space region of the housing, wherein the power part extends through the housing body part, and the pressurized part is positioned in the space region; and
- a housing cover part positioned on the housing body part and configured to prevent the pressurized part from departing from the space region.

6. The sensing device of claim 1, wherein the pressurized fluid is transferred to or discharged from the housing through a flow path formed on the housing, the flow path being openable and closable.

7. The sensing device of claim 1, wherein the sensing part is positioned in the power part.

8. The sensing device of claim 1, wherein the sensing part is positioned a rear portion of the housing, and connected to the housing.

9. The sensing device of claim 1, wherein the sensing part is positioned at a side portion of the housing and connected to housing.

10. The sensing device of claim 1, wherein the sensing part is positioned outside the power part and connected to the housing positioned in the power part through a sensing flow path part.

* * * * *